United States Patent [19]
Fernie et al.

[11] Patent Number: 5,933,125
[45] Date of Patent: Aug. 3, 1999

[54] METHOD AND APPARATUS FOR REDUCING INSTABILITY IN THE DISPLAY OF A VIRTUAL ENVIRONMENT

[75] Inventors: Andrew Fernie, Montreal; Ken Unger, Quebec, both of Canada

[73] Assignee: CAE Electronics, Ltd., Quebec, Canada

[21] Appl. No.: 08/563,195

[22] Filed: Nov. 27, 1995

[51] Int. Cl.⁶ .................................................. G09G 5/00
[52] U.S. Cl. ................................................. 345/8; 345/121
[58] Field of Search .............................. 345/7, 8, 13, 14, 345/121; 348/53, 115; 359/13, 630

[56] References Cited

U.S. PATENT DOCUMENTS

| | | |
|---|---|---|
| 4,349,815 | 9/1982 | Spooner . |
| 4,446,480 | 5/1984 | Breglia et al. . |
| 4,737,778 | 4/1988 | Nishi et al. . |
| 4,934,773 | 6/1990 | Becker . |
| 4,984,179 | 1/1991 | Waldern . |
| 5,003,300 | 3/1991 | Wells . |
| 5,200,356 | 4/1993 | Tanaka . |
| 5,320,534 | 6/1994 | Thomas . |
| 5,321,416 | 6/1994 | Bassett et al. . |
| 5,334,991 | 8/1994 | Wells et al. . |
| 5,369,450 | 11/1994 | Haseltine et al. . |
| 5,422,653 | 6/1995 | Maguire, Jr. . |
| 5,446,834 | 8/1995 | Deering . |
| 5,579,026 | 11/1996 | Tabata ..................................... 345/121 |

FOREIGN PATENT DOCUMENTS

| | | |
|---|---|---|
| 0 502 643 A2 | 9/1992 | European Pat. Off. . |
| 709 816A2 | 5/1996 | European Pat. Off. . |
| WO 94/09472 | 4/1994 | WIPO . |

OTHER PUBLICATIONS

"Non Linear Prediction of Head Movements for Helmet Mounted Displays" (AFHRL Technical Paper 83–45 Dec. 1983).

"HDTV Virtual Reality" by B. Welch and R. Kruk published in Japan Display 1992—pp. 407–410.

"Recent Advances in Television Visual Systems" by B. Welch AGARD Conference Proceedings No. 249, Brussels, Belgium Apr. 24–27, 1978.

Watson Industries, Inc. "Angular Rate Sensor Manual"—ARS–C121–1A; ARS–C131–1A; ARS–C141–1A; ARS–C151–1A; ARS–C161–1A.

*Primary Examiner*—Regina Liang
*Attorney, Agent, or Firm*—Canton Colburn LLP

[57] ABSTRACT

The present invention relates to a method for reducing image instability in a virtual environment due to the transport delay of the image generator and other components of the system. A method is given for determining the error in the generated virtual environment and using this error for shifting the image on the display device thus providing a more accurate and more stable representation to the viewer.

16 Claims, 4 Drawing Sheets

METHOD AND APPARATUS FOR REDUCING INSTABILITY IN THE DISPLAY OF A VIRTUAL ENVIRONMENT

FIELD OF THE INVENTION

The present invention relates to a method and apparatus for displaying a virtual environment on a video display in which small errors in visual orientation of the virtual environment are corrected by carrying out small shifts in the displayed image. The invention relates further to such a method and apparatus in which the visual orientation of the display with respect to the virtual environment is predicted and the next image of the virtual environment generated from the predicted visual orientation is displayed and shifted based on the difference between the actual and predicted visual orientations of the display with respect to the virtual environment.

In the case of a head mounted display, the invention reduces "image motion" of the displayed virtual environment resulting from head movements and caused by the transport delay of the image generator and other system components such as the head tracker.

BACKGROUND OF THE INVENTION

Computer image generators used in simulation and in virtual reality systems have an inherent transport delay due to the finite amount of time taken to perform the various computational algorithms necessary to assemble an image of the virtual environment with proper attributes. The effect of this transport delay on the performance of pilots in flight simulators has been well known for many years and care is taken to minimize such delays in image generation systems specifically designed for flight simulation. A far more obvious effect is seen, however, when image generation systems are coupled to head mounted displays. In these systems, the head position is continually being measured and is used by the image generator to compute the correct scene for the observer's viewpoint (the visual orientation of the display with respect to the virtual environment). If the observer moves his or her head while looking at a stationary image, the image will move in the direction of the head motion for a period of time corresponding to the total transport delay of the system (including head measuring device) and will only regain the correct position once the observer's head is stationary.

This effect detracts considerably from the utility of the head mounted display and can give rise to nausea. The problem and a reasonably effective solution is described by Uwe List in a U.S. Airforce report entitled "Non Linear Prediction of Head Movements for Helmet Mounted Displays" (AFHRL Technical Paper 83-45 December 1983). In this report, List recommends the use of angular acceleration sensors mounted on the helmet to calculate a predicted head position. Welch and Kruk also suggest this solution in "HDTV Virtual Reality" published in Japan Display 1992.

These solutions relate to predicting the visual orientation of the display with respect to the virtual environment for a time in the future approximately equivalent to the present time plus the transport delay of the system. This prediction is accomplished by using measurements of angular head acceleration and/or angular head velocity. The image generator then uses this predicted position to compute the next image. While the prediction of visual orientation or head position can be used in the image generator to greatly reduce the error or discrepancy between the image of the virtual environment being displayed and the correct image of the virtual environment for the actual visual orientation, this technique cannot eliminate such errors completely. Accordingly, it is a primary object of this present invention to provide a relatively inexpensive and simple system to substantially reduce such errors thereby providing a more stable and accurate representation of the virtual environment.

SUMMARY OF THE INVENTION

Briefly the essence of the present invention is to provide a more stable and accurate representation of a virtual environment by calculating the discrepancy between the angular orientation of the image being displayed and the current visual orientation of the display and use this error to shift the image to the correct position.

According to the invention, there is provided a method and apparatus for displaying a virtual environment on a video display comprising the repeated steps of determining a visual orientation of the display with respect to the virtual environment; generating an image of the virtual environment for the visual orientation; the generating requiring a finite delay time; displaying the image on the display; detecting any change in the visual orientation which may have occurred between a time when the visual orientation was determined and the image was generated; and shifting the image on the display an amount equivalent to the change, whereby the display of the virtual environment is more stable and accurate.

Preferably, the method according to the invention also includes steps of measuring at least one of an angular velocity and an angular acceleration of the visual orientation; and calculating a predicted visual orientation of the display with respect to the virtual environment based on the visual orientation and at least one of the angular velocity and the angular acceleration, the predicted visual orientation being for a future point in time equal to a present time plus approximately the finite delay time.

According to the invention, there is also provided an apparatus for displaying a virtual environment on a video display comprising head position processor means for generating a visual orientation signal indicating a visual orientation of the display with respect to the virtual environment; image generator means for generating an image of the virtual environment for the visual orientation, the image generating means receiving the visual orientation signals, the image generator means having a finite transport delay time for generating and preparing an image for transmission on a video output signal; a display receiving the video output signal for display the image; means for detecting any change in the visual orientation signal from a time when the signal was used by the image generator means to generate the image and a time of display of the image on the display to produce an offset shift signal; and means for shifting the image on the display in response to the offset shift signal, whereby the display of the virtual environment is more stable and accurate.

Preferably, the apparatus further comprises means for detecting at least one of an angular velocity and an angular acceleration of the visual orientation for producing a predictive signal; means for calculating a predicted visual orientation of the display with respect to the virtual environment based on the visual orientation signal and the predictive signal to produce a predicted visual orientation signal, the predicted visual orientation signal being connected to the image generator means in place of the visual orientation signal generated by the determining means, the predicted visual orientation signal being for a future point in time equal to a present time plus approximately the transport delay time.

The invention thus provides two ways to improve the display of a virtual environment on a video display. In one way, small changes in the visual orientation of the display with respect to the virtual environment are detected and used to control shifting of the image so that small discrepancies between the actual visual orientation and the visual orientation of the displayed image are corrected, whether these small discrepancies result from transport delay or the combination of transport delay and rapid changes in the visual orientation of the display with respect to the virtual environment. In the second way, errors in the prediction of the visual orientation are corrected by shifting of the image on the display. It is preferred that the displayed image is continuously shifted to account for small changes between the actual or present visual orientation and the visual orientation of the image being displayed in order to make the representation of the virtual environment more accurate.

BRIEF DESCRIPTION OF THE DRAWINGS

The invention will be better understood by way of the following detailed description of a preferred embodiment of the invention with reference to the appended drawings in which.

DETAILED DESCRIPTION OF THE PREFERRED EMBODIMENT

Figure 1:
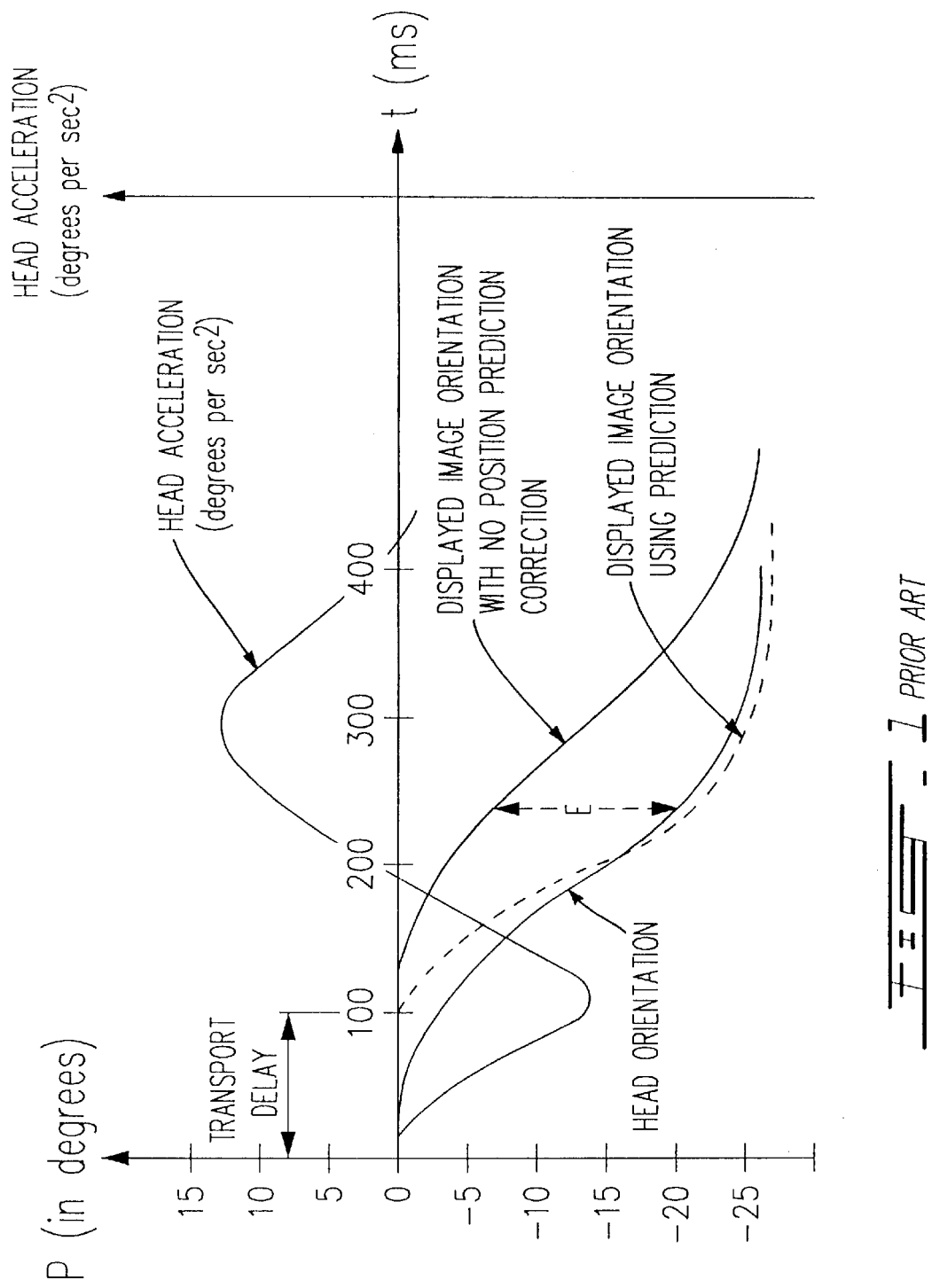
FIG. 1 illustrates a graph of head acceleration, head position, an example of displayed image position with no prediction correction, and displayed image position using position prediction correction in the case of a computer image generator having a transport delay of 100 milliseconds, as is known in the prior art.

In the preferred embodiment, the virtual environment video display is a head mounted or helmet mounted display (HMD) of the type known in the art. The helmet is provided with position and angular acceleration sensors as is also known in the art. FIG. 1 illustrates an exemplary acceleration curve as a user moves between two visual orientations. As can be seen, the acceleration is shown in the example to peak at 100 milliseconds with a deceleration or stopping of the head motion commencing near 200 milliseconds and ending near 400 milliseconds with the head of the helmet in its new angular position. In FIG. 1, it is presumed that the head position sensor and the computer image generator requires 100 milliseconds to detect head position and generate an image for the new head position (i.e. the transport delay is 100 ms). The curve illustrating the displayed image orientation with no position prediction correction results in considerable unwanted image motion illustrated near 250 milliseconds as the difference of some 12° by the reference letter E. In the prior art improvement, prediction of future position using acceleration measurements resulted in the dashed line for the image orientation with small but noticeable divergence between the predicted line and the actual head orientation curve. As will be seen below, use of the method and apparatus according to the present invention can result in the displayed image orientation following the actual head orientation more closely resulting in an almost imperceptible amount of image instability.

Figure 2:
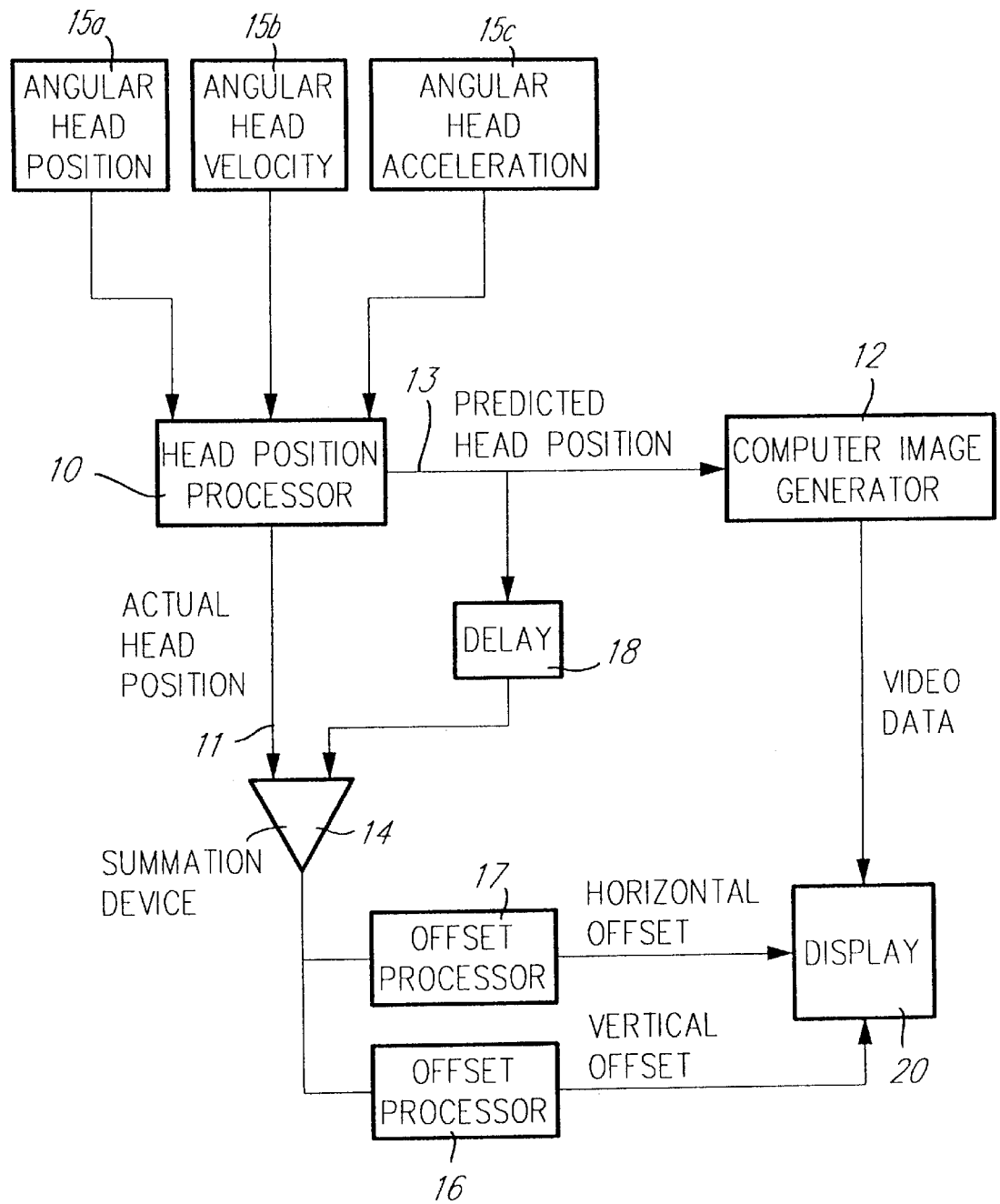
FIG. 2 illustrates a block diagram of the virtual environment display apparatus according to the preferred embodiment in which the difference between the actual head position and the predicted head position is used to control horizontal vertical offsets of the video display.

As illustrated in FIG. 2, the apparatus according to the invention comprises a head position processor which receives the output signals from the head position sensor 15a and the head angular acceleration sensors 15c. Optionally, angular head velocity sensors 15b may be provided as well as or in place of the acceleration sensor. The head position processor 10 reads the raw data and outputs an actual head position output signal 11 fed to a summation device 14. The head position processor 10 also predicts the head or helmet position based on actual position and the measurement of the head acceleration and/or head velocity. If a head velocity sensor is not used, the velocity is calculated from either differentiating position or preferably integrating acceleration. The head position is predicted for a point in time ahead in the future by an amount equivalent to the transport delay inherent in the system. The predicted head position signal 13 is fed into a delay circuit 18 which delays the signal by an amount of time equal to the transport delay before feeding it to the summation device 14 where it is subtracted from the actual head position signal on line 11. This difference signal is fed to offset processors 16 and 17 where the vertical and horizontal offsets respectively are determined resulting in the vertical and horizontal offset signals fed to display 20.

In the case that the display is a CRT (cathode ray tube) video display, the horizontal and vertical offset signals are fed to horizontal and vertical scan circuits.

Figure 4:
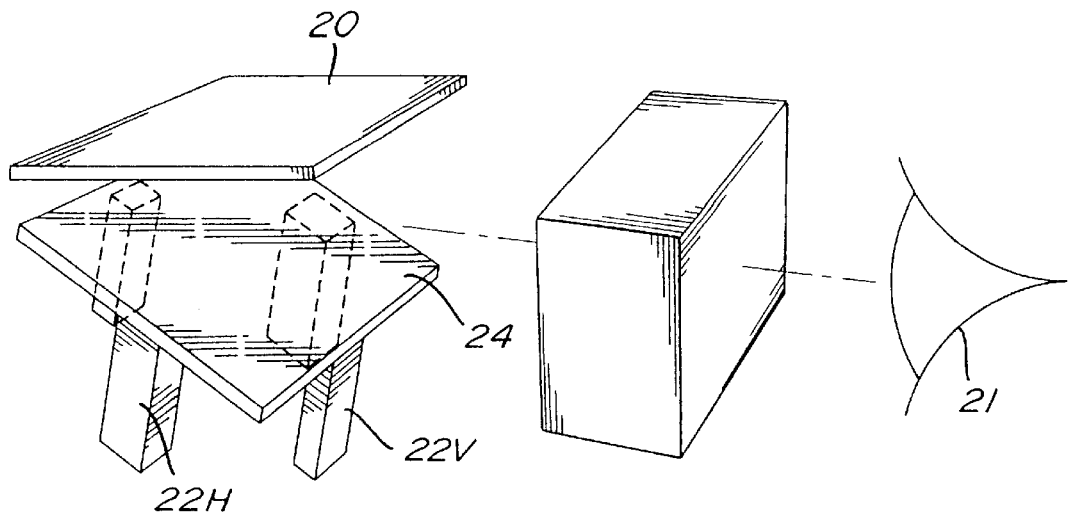
FIG. 4 illustrates an optical schematic for a display system using a moveable mirror to perform the shifting function.
Figure 5:
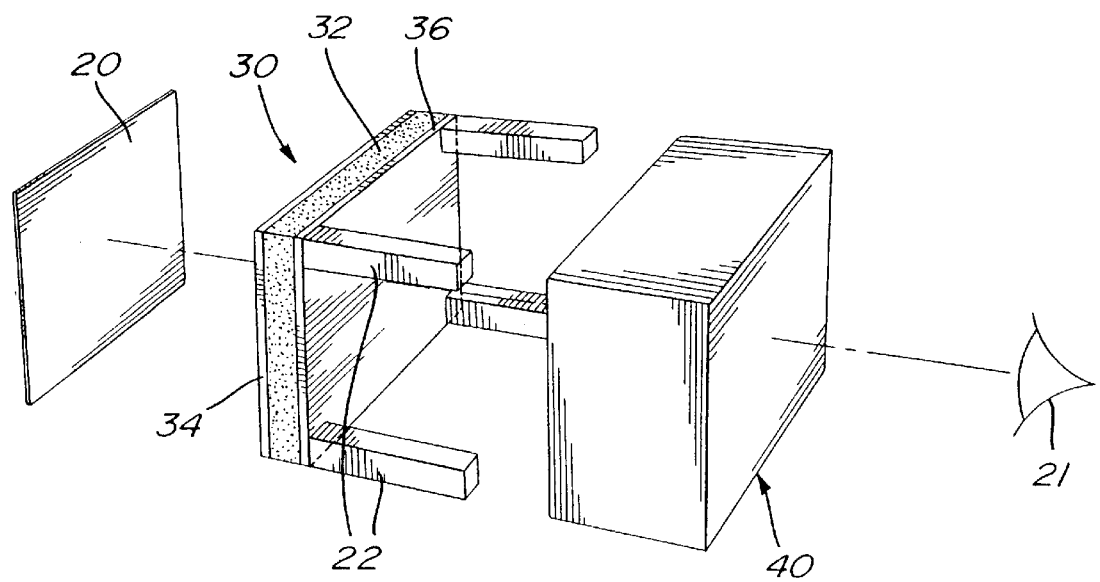
FIG. 5 illustrates an optical schematic for a display system where the shifting function is performed by a liquid filled prism.

In the case that the shifting of the image is to be done optically, transducers 22 may be used to change the angular orientation of a mirror as illustrated in FIG. 4 or similar transducers may be used to change a refraction of the image passing through a liquid filled prism 36 having transparent cover plates 34 and 36 moveable in angular orientation with respect to one another as shown in FIG. 5. In both FIGS. 4 and 5, the shifted image is viewed through an eyepiece 40 by an eye 21 The vertical and horizontal offsets can alternatively be carried out by image position shifting within the video display controller, a video display controller as disclosed in U.S. Pat. No. 4,737,778 (Nishi et al) may be used to vertically and horizontally shift the whole video image displayed on the screen of the video display unit 20.

Figure 3:
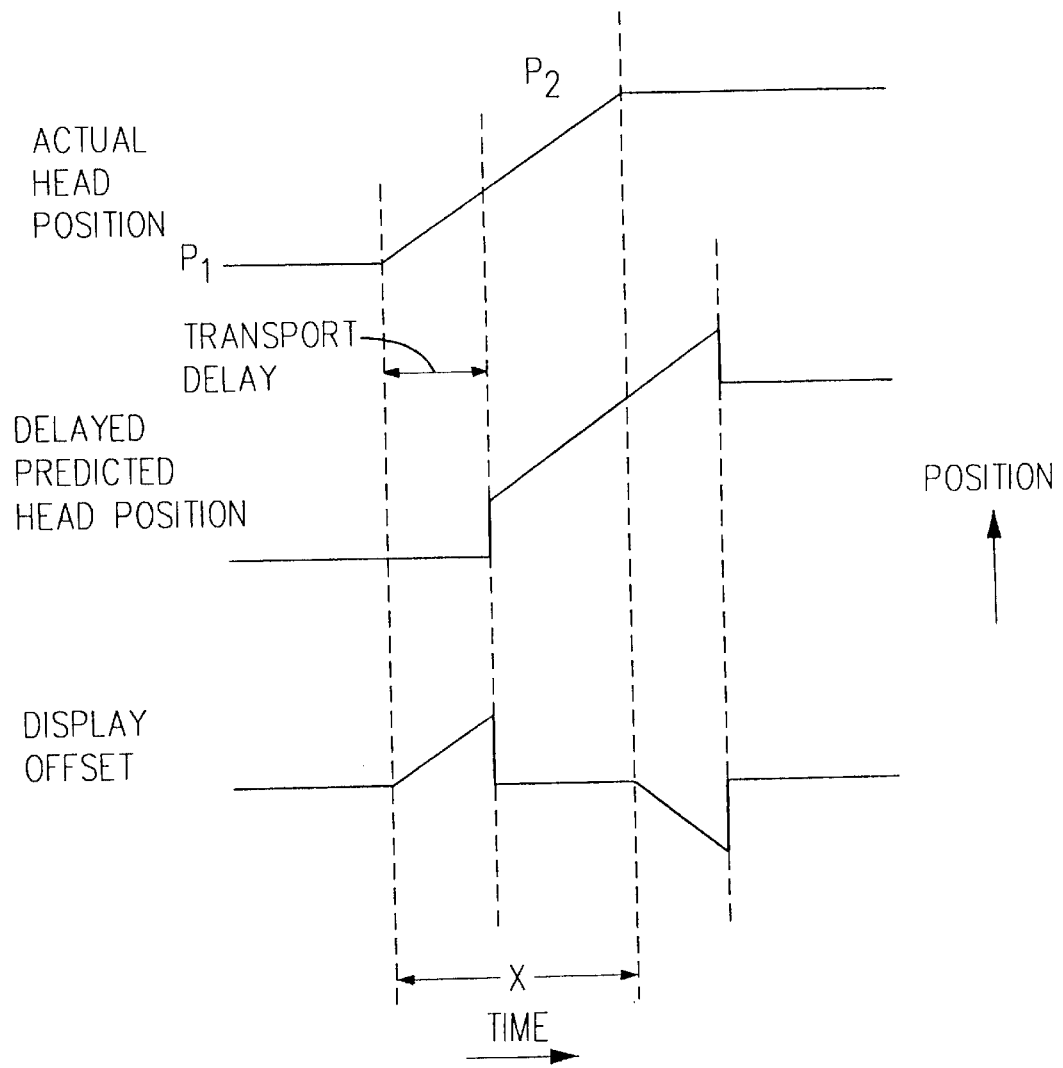
FIG. 3 illustrates actual head position, delayed predicted head position and display offset signals on a common time scale for a simple example in which actual head position moves with constant velocity for a time X between positions $P_1$ and $P_2$.

In the example illustrated in FIG. 3, the observer's helmet position moves from a position $P_1$ to a position $P_2$ under constant velocity. This example is simplified in that it does not take into consideration normal acceleration and deceleration. In the first time frame labeled as the transport delay, the display offset in one or both of the horizontal and vertical directions is illustrated to ramp upwardly for the duration of the transport delay, at which time the display offset is set back to zero and the new image is displayed on the display 20. The resetting of the display offset and the update in the image of the virtual environment takes place without the observer seeing a sharp change in the image. At the point in time X when the actual head position has reached $P_2$ and stopped, the predicted head position based on the previous velocity is for a position which continues along the same path beyond the position $P_2$. At the instant that the actual head position stops and the delayed predicted head position continues to increase, the display offset is ramped to decrease so that the observed image is stationary in keeping with the actual head position.

Although the invention has been described as applied to a virtual environment system using a computer image generator as the image source, it can, with suitable modifications, take into account certain operational differences that will be apparent to one skilled in the art, be applied to virtual presence or telepresence systems which use image sensors such as television cameras mounted on head slaved gimbal systems. Accordingly, it is within the contemplation of the invention and the claims are intended to encompass all types of virtual environment systems where transport delays would normally cause image instability.

We claim:

1. A method for displaying a virtual environment on a video display comprising the repeated steps of:

determining a visual orientation of said display with respect to said virtual environment and generating an orientation signal representing said visual orientation;

generating an image of said visual environment for said visual orientation identified by said orientation signal, said generating requiring a finite delay time;

detecting any change in said visual orientation which may have occurred between a time when said visual orientation was determined and said image was generated; and displaying said image on said display, said image being shifted on said display by an amount equivalent to said change, whereby the display of the virtual environment is more stable.

2. The method as claimed in claim 1, further comprising steps of:

measuring at least one of an angular velocity and an angular acceleration of said visual orientation; and calculating a predicted visual orientation of said display with respect to said virtual environment based on said visual orientation and at least one of said angular velocity and said angular acceleration, said predicted visual orientation being for a future point in time equal to a present time plus approximately said finite delay time.

3. The method as claimed in claim 1, wherein said video display is a head mounted display.

4. The method as claimed in claim 2, wherein said video display is a head mounted display.

5. An apparatus for displaying a virtual environment on a video display comprising:

head position processor means for generating a visual orientation signal indicating a visual orientation of said display with respect to said virtual environment;

image generator means for generating an image of said virtual environment for said visual orientation, said image generating means receiving said visual orientation signals, said image generator means having a finite transport delay time for generating and preparing an image for transmission on a video output signal;

a display receiving said video output signal for display said image;

means for detecting a difference between said visual orientation signal at a time when said orientation signal was used by said image generator means to generate said image and said visual orientation signal at a time of display of said image on said display and for producing an offset shift signal proportional to said difference; and means for shifting said image on said display in response to said offset shift signal, whereby the display of the virtual environment is more stable.

6. The apparatus as claimed in claim 5, further comprising means for detecting at least one of an angular velocity and an angular acceleration of said visual orientation for producing a predictive signal;

means for calculating a predicted visual orientation of said display with respect to said virtual environment based on said visual orientation signal and said predictive signal to produce a predicted visual orientation signal, said predicted visual orientation signal being connected to said image generator means in place of said visual orientation signal generated by said determining means, said predicted visual orientation signal being for a future point in time equal to a present time plus approximately said transport delay time.

7. The apparatus as claimed in claim 5, wherein said visual orientation determining means comprise an angular head position sensor, said video display being a head mounted display.

8. The apparatus as claimed in claim 6, wherein said video display is a head mounted display, said means for determining visual orientation comprise an angular head position sensor, and said means for determining at least one of an angular velocity and an angular acceleration comprise at least one of an angular head velocity sensor and an angular head acceleration sensor.

9. The apparatus as claimed in claim 5, wherein said video display is a cathode ray tube display, and said shifting means comprise means for adjusting a horizontal offset and a vertical offset of said cathode ray tube display.

10. The apparatus as claimed in claim 5, wherein said shifting means comprise image relay optics including controllable means for angularly displacing horizontally and vertically an image relayed by said optics.

11. The apparatus as claimed in claim 6, wherein said video display is a cathode ray tube display, and said shifting means comprise means for adjusting a horizontal offset and a vertical offset of said cathode ray tube display.

12. The apparatus as claimed in claim 6, wherein said shifting means comprise image relay optics including controllable means for angularly displacing horizontally and vertically an image relayed by said optics.

13. An apparatus for displaying a virtual environment represented by images generated by an image generator having a finite transport delay time, said image generator generating said images for a given visual orientation of a video display displaying said images with respect to said virtual environment, said image generator receiving a visual orientation signal representing said visual orientation, said apparatus comprising:

means for detecting any change in said visual orientation signal from a time when said signal was used by said image generator means to generate said image and a time of display of said image on said display to produce an offset shift signal; and means for shifting said image on said display in response to said offset shift signal, whereby the display of the virtual environment is more stable.

14. The apparatus as claimed in claim 13, further comprising means for detecting at least one of an angular velocity and an angular acceleration of said visual orientation for producing a predictive signal;

means for calculating a predicted visual orientation of said display with respect to said virtual environment based on said visual orientation signal and said predictive signal to produce a predicted visual orientation signal, said predicted visual orientation signal being connected to said image generator means in place of said visual orientation signal generated by said determining means, said predicted visual orientation signal being for a future point in time equal to a present time plus approximately said transport delay time.

15. The apparatus as claimed in claim 13, wherein said video display is a head mounted display, said visual orientation signal representing an angular head position.

16. The apparatus as claimed in claim 14, wherein said video display is a head mounted display, said visual orientation signal represents an angular head position, and said means for determining at least one of an angular velocity and an angular acceleration comprise at least one of an angular head velocity sensor and an angular head acceleration sensor.

* * * * *